US011454054B2

(12) United States Patent
Kondo

(10) Patent No.: US 11,454,054 B2
(45) Date of Patent: Sep. 27, 2022

(54) LOCK DEVICE

(71) Applicant: Nifco Inc., Yokosuka (JP)

(72) Inventor: Kouji Kondo, Yokosuka (JP)

(73) Assignee: NIFCO INC., Kanagawa (JP)

(*) Notice: Subject to any disclaimer, the term of this patent is extended or adjusted under 35 U.S.C. 154(b) by 606 days.

(21) Appl. No.: 16/325,223

(22) PCT Filed: Aug. 30, 2017

(86) PCT No.: PCT/JP2017/031045
§ 371 (c)(1),
(2) Date: Feb. 13, 2019

(87) PCT Pub. No.: WO2018/047684
PCT Pub. Date: Mar. 15, 2018

(65) Prior Publication Data
US 2019/0203509 A1    Jul. 4, 2019

(30) Foreign Application Priority Data
Sep. 8, 2016 (JP) .............................. JP2016-175822

(51) Int. Cl.
*E05C 9/04*    (2006.01)
*E05C 1/14*    (2006.01)
(Continued)

(52) U.S. Cl.
CPC .............. *E05C 9/041* (2013.01); *B60R 7/06* (2013.01); *E05B 83/30* (2013.01); *E05C 1/14* (2013.01);
(Continued)

(58) Field of Classification Search
CPC ............. Y10T 292/0843; Y10T 292/08; Y10T 292/0801; Y10T 292/0834;
(Continued)

(56) References Cited

U.S. PATENT DOCUMENTS 8,033,582 B2    10/2011  Sawatani et al.
8,141,398 B2 *   3/2012  Ookawara ............... E05C 1/145
                                                        70/208
(Continued)

FOREIGN PATENT DOCUMENTS

DE          3932909 A1 *  4/1991  ............... B60R 7/06
DE         10036945 A1 *  2/2002  ............. E05B 77/42
(Continued)

OTHER PUBLICATIONS

English translation of Notification of Reasons for Refusal for KR Application No. 10-2019-7005218, dated Mar. 17, 2020, 8 pages.
(Continued)

*Primary Examiner* — Kristina R Fulton
*Assistant Examiner* — Steven A Tullia
(74) *Attorney, Agent, or Firm* — Armstrong Teasdale LLP

(57) ABSTRACT

A lock device includes a base attached to a lid, a knob having a grip portion movably supported on a front side of the base and an arm portion projecting rearward with respect to the grip portion, a slider slidably supported in a rear part of the base so as to move slidingly by being pushed by the arm portion in response to a movement of the knob, a first rod and a second rod slidably supported by a part of the base located in front of the slider in a vertically arranged manner so as to be engaged by and disengaged from a pair of corresponding engaging holes, and a power transmission mechanism provided between the slider and the first rod and the second rod so that the first rod and the second rod are slidingly moved in response to a movement of the slider.

7 Claims, 7 Drawing Sheets

(51) Int. Cl.
*E05C 21/00* (2006.01)
*B60R 7/06* (2006.01)
*E05B 83/30* (2014.01)
*E05B 17/00* (2006.01)
*E05B 47/00* (2006.01)

(52) U.S. Cl.
CPC ............ *E05C 9/04* (2013.01); *E05C 21/00* (2013.01); *E05B 17/0041* (2013.01); *E05B 2047/002* (2013.01)

(58) Field of Classification Search
CPC ......... Y10T 292/0837; Y10T 292/0839; Y10T 292/084; Y10T 292/0844; E05C 9/041; E05C 1/14; E05C 9/04; E05C 21/00; E05C 9/00; E05C 9/002; E05C 9/006; E05C 9/10; E05C 9/12; E05C 9/20; E05C 9/22; E05C 1/12; E05C 1/145; B60R 7/06; E05B 83/30; E05B 17/0041; E05B 2047/002; E05B 83/28; Y10S 292/11; Y10S 292/31
See application file for complete search history.

(56) References Cited

U.S. PATENT DOCUMENTS

| | | | | |
|---|---|---|---|---|
| 8,590,351 | B2 * | 11/2013 | Ookawara | E05B 83/30 70/162 |
| 2004/0017088 | A1 | 1/2004 | Sawatani et al. | |
| 2004/0256859 | A1 * | 12/2004 | Yamada | E05B 83/30 292/32 |
| 2007/0080542 | A1 * | 4/2007 | Ookawara | E05B 83/30 292/36 |
| 2011/0309640 | A1 * | 12/2011 | Matsubara | E05B 83/30 292/159 |
| 2015/0111676 | A1 | 4/2015 | Nishikawa et al. | |
| 2015/0152671 | A1 * | 6/2015 | Nakasone | E05B 1/0038 292/169 |
| 2016/0258195 | A1 | 9/2016 | Fukumoto | |

FOREIGN PATENT DOCUMENTS

| | | | | |
|---|---|---|---|---|
| DE | 102008041724 | A1 * | 3/2010 | ........... E05B 47/026 |
| DE | 102014116407 | A1 * | 5/2015 | ............ E05C 9/041 |
| EP | 0922827 | A1 * | 6/1999 | ............ E05C 9/041 |
| EP | 2090468 | A1 * | 8/2009 | ............ E05B 13/10 |
| EP | 2105353 | A1 * | 9/2009 | ............... B60R 7/06 |
| EP | 2653638 | A1 * | 10/2013 | ............ E05B 83/30 |
| JP | S60046765 | U | 4/1985 | |
| JP | 2003314120 | A | 11/2003 | |
| JP | 2004003227 | A | 1/2004 | |
| JP | 2009215740 | A * | 9/2009 | ............ E05B 83/30 |
| JP | 2009235794 | A * | 10/2009 | |
| JP | 5608280 | B | 10/2014 | |
| JP | 2015078519 | A | 4/2015 | |
| JP | 2016084001 | A | 5/2016 | |
| KR | 100674442 | B1 | 1/2007 | |
| KR | 20120131807 | A * | 12/2012 | ............ E05B 83/30 |
| WO | WO-2011145859 | A2 * | 11/2011 | ............ E05B 83/30 |
| WO | WO-2015125774 | A1 * | 8/2015 | ............... E05C 9/04 |
| WO | WO-2016098118 | A1 * | 6/2016 | ............ E05B 83/30 |

OTHER PUBLICATIONS

International Search Report for International Application No. PCT/JP2017/031045, dated Oct. 10, 2017, 2 pages.

* cited by examiner

LOCK DEVICE

CROSS-REFERENCE TO RELATED APPLICATIONS

This application is a U.S. National Phase Application of PCT/JP2017/031045, filed Aug. 30, 2017, which claims the benefit of priority to JP Application No. 2016175822, filed Sep. 8, 2016, the contents of which are hereby expressly incorporated by reference in their entirety.

TECHNICAL FIELD

The present invention relates to a lock device for a storage device having a box and a lid.

BACKGROUND ART

A known lock device for a glove box of an automobile includes a base provided on a lid, a knob provided on the base so as to be rotatable about a laterally extending axial line, a plate vertically slidably mounted to the base, and configured to be moved downward in response to a rotational movement of the knob, a pair of stays provided on the front and rear sides of the plate, respectively, in sliding contact with the plate via a cam having an inclined surface, the stays being configured to move laterally in mutually opposite directions in response to a vertical movement of the plate, and a pair of rods extending in mutually opposite directions and each having a base end connected to the corresponding stay and a free end configured to be selectively received in a connecting hole formed in a corresponding part of the box of the glove box. See Patent Document 1, for instance. In this lock device, the lid is normally kept in a closed state with the laterally arranged two rods engaged by the respective connecting holes, and can be made movable relative to the box when the rods are disengaged from the respective connective holes by operating the knob.

PRIOR ART DOCUMENT(S)

Patent Document(s)

Patent Document 1; JP5608280B

SUMMARY OF THE INVENTION

Task to be Accomplished by the Invention

Since the lock device described above is provided on the lid of the storage device, the thickness of the lid is desired to be small since a large thickness of the lock device causes the thickness of the lid to be increased, and the storage space of the storage device to be reduced. In the case of the lock device disclosed in Patent Document 1, since the stays are provided on the front and rear sides of the plate, respectively, the thickness of the lock device in the fore and aft direction is undesirably great. Also, in the case where the lock device is arranged such that the plate is moved slidingly by rotating a knob, if the distance between the rotational center line of the knob and the plate is small, the stroke of the plate as well as the strokes of the rods may be so small for a given angular displacement of the knob that the angular displacement of the knob required to disengage the lock device may become unacceptably great.

In view of such a problem of the prior art, a primary object of the present invention is to provide a lock device for a storage device having a small thickness in the fore and aft direction.

Means for Accomplishing the Task

To achieve such an object, the present invention provides a lock device for a storage device, the storage device having a box opening forward and a lid configured to close the opening of the box, the lock device comprising: a base attached to the lid; a knob having a grip portion movably supported on a front side of the base and arranged on a front surface of the lid and an arm portion projecting rearward with respect to the grip portion; a slider slidably supported in a rear part of the base so as to move slidingly by being pushed by the arm portion in response to a movement of the knob; a first rod and a second rod slidably supported by a part of the base located in front of the slider in a vertically arranged manner, and extending in parallel to each other in mutually opposite directions from the base so as to be engaged by and disengaged from a pair of corresponding engaging portions provided on the box as the first rod and the second rod move slidingly; and a power transmission mechanism provided between the slider and the first rod and the second rod so that the first rod and the second rod are slidingly moved in response to a movement of the slider.

In this arrangement, since both the first rod and the second rod are disposed on the front side of the slider, and the first rod and the second rod are arranged to overlap in the vertical direction, the fore and aft width required for accommodating the first rod and the second rod is minimized, and the fore and aft widths of the base and the lock device are hence minimized. Further, since the slider is disposed rearward of the first rod and the second rod in the base and a certain distance is secured between the slider and the knob provided on the front, even when the displacement mode of the knob is rotational, the displacements of the slider, the first rod, and the second rod for a given operation amount of the knob can be maximized.

Preferably, in this arrangement, the knob is supported so as to be rotatable about an axial line positioned in front of the first rod and the second rod.

Owing to this arrangement, the distance between the slider and the rotational center line of the knob is maximized for the given distance between the grip portion and the rotational center line of the knob so that the movement stroke of the slider with respect to the operation amount of the knob can be maximized.

Preferably, in this arrangement, the power transmission mechanism includes a cam groove recessed from a front surface of the slider, and extending obliquely relative to a direction of a sliding movement of the slider, and a pin projecting from a rear surface of the first rod and engaged by the cam groove.

Thereby, the power transmission mechanism can have a simple configuration.

Preferably, in this arrangement, the power transmission mechanism includes a first rack formed on the front surface of the slider and extending along the direction of the sliding movement of the slider, a second rack provided on the second rod and extending along a lengthwise direction of the second rod, and a pinion rotatably supported by the base and meshing with the first rack and the second rack.

Thereby, the size of the slider can be minimized. In the case where the first rod and the second rod are moved in mutually opposite directions in response to the movement of the slider, if the cam grooves were provided for the respective rods, the extending directions of the cam grooves would not be parallel to each other so that the slider would be required to be increased in size to avoid interference. Thus, with respect to the second rod, by providing a gear mechanism consisting of the first rack, the pinion and the second rack in place of the cam groove, the slider can be made small and the entire lock device can be reduced in size.

Preferably, in this arrangement, the power transmission mechanism includes a link rotatably supported by the base at a central part thereof with respect to a lengthwise direction, two lengthwise ends of the link being rotatably connected to base ends of the first rod and the second rod, respectively.

Thereby, the power transmission mechanism can have a simple configuration.

Preferably, in this arrangement, the base rotatably supports the knob about an axial line extending vertically, vertically slidably supports the slider, and laterally slidably supports the first rod and the second rod.

Thereby, it is possible to provide a lock device suitable for a lid rotatable about a laterally extending axial line.

Preferably, in this arrangement, the slider is provided with a cam surface inclined with respect to a vertical direction along a side edge thereof, and is configured to be pushed by the arm portion at the cam surface.

Thereby, the rotation of the knob can be converted into the sliding movement of the slider by using a simple configuration.

Preferably, in this arrangement, the base is provided with an arm receiving hole extending in a fore and aft direction and rotatably receiving the arm portion.

In this arrangement, since the arm portion passes through the base, the arm portion and the slider are not required to be increased in size so as to avoid interference with the base. Thereby, the size of the lock device can be reduced.

Preferably, in this arrangement, the base includes a slider receiving hole extending vertically to receive the slider in a vertically slidable manner, a first rod receiving hole extending laterally to receive the first rod in a laterally slidable manner, and a second rod receiving hole extending laterally to receive the second rod in a laterally slidable manner, the slider receiving hole being connected to the arm receiving hole, the first rod receiving hole, and the second rod receiving hole.

Thereby, the slider, the first rod and the second rod can be supported by the base in a highly stable manner.

Preferably, in this arrangement, the lock device further comprises a biasing member provided on an end portion of the first rod or the second rod on a side of the engaging portion to bias the first rod or the second rod toward the engaging portion with respect to the lid.

According to this arrangement, since the biasing member is provided in a part remote from the base, the base can be reduced in size. In addition, since the biasing member is provided in the end portion of the first or second rod on the side of the engaging portion, the biasing force of the biasing member can be transmitted to the free end portion of the first or second rod in a reliable manner so that rattling between the engaging portion and the first or the second rod can be minimized.

Preferably, in this arrangement, the lock device further comprises a guide member provided on the lid and provided with a guide hole through which an end portion of the first rod or the second rod on a side of the engaging portion passes, the biasing member being provided between the guide member and the first rod or the second rod.

Thereby, the first or second rod can be supported by the guide member so that the movement locus thereof can be stabilized.

Effect of the Invention

Owing to the above configuration, it is possible to reduce the fore and aft thickness in the lock device of the storage device.

DETAILED DESCRIPTION OF THE PREFERRED EMBODIMENTS

A lock device for a glove box of an automobile according to an embodiment of the present invention is described in the following with reference to the appended drawings.

Figure 1:
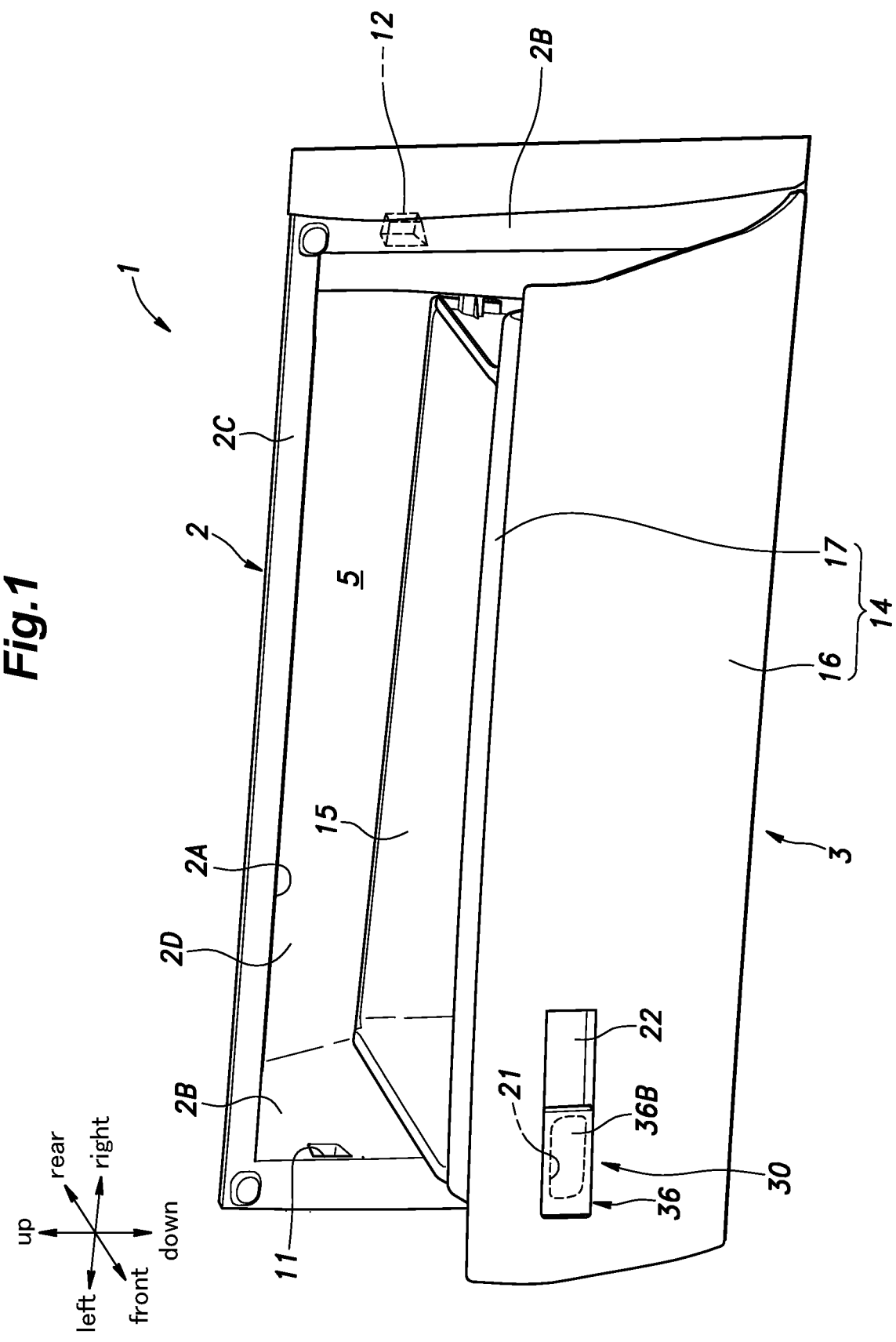
FIG. 1 is a perspective view of a glove box provided with a lock device according to an embodiment of the present invention.

As shown in FIG. 1, a glove box 1 given as an example of a storage device is provided with a box 2 opening out toward one side, and a lid 3 for closing the opening 2A of the box 2. In the following description, it is assumed that the opening 2A of the box 2 is open toward the front, and the lid 3 is provided on the front part of the box 2 with reference to FIG. 1. The direction in which the opening 2A opens as shown here does not limit the possible opening directions in the other possible embodiments. For example, when the glove box 1 is provided in a part of the instrument panel of the automobile corresponding to the assistant's seat, the glove box 1 may be arranged so that the opening 2A faces rearward with respect to the automobile.

The box 2 includes a pair of box side walls 2B, and a box top wall 2C, a box back wall 2D and a box bottom wall each extending between the left and right box side walls 2B, and internally defines an inner space 5 having an open front side. The front opening 2A is defined by the front edges of the left and right box side walls 2B, the box top wall 2C, and the box bottom wall. An upper front part of the inner surface of each box side wall 2B is formed with an engaging hole 11, 12 (left engaging hole 11 and right engaging hole 12) which is recessed in a laterally outward direction.

The lid 3 includes a front side plate 14 and a bucket 15 provided on the back of the front side plate 14 and opening upward. The lid 3 is rotatably supported on the inner surfaces of the left and right box side walls 2B at lower side parts of the bucket 15 around an axial line extending laterally. The lid 3 can be rotated between a closed position in which the bucket 15 is entirely received in the inner space 5 and the front side plate 14 closes the opening 2A, and an open position in which the front side plate 14 is displaced forward from the opening 2A and a part of the bucket 15 is positioned out of the opening 2A.

The front side plate 14 is formed as a hollow structure by joining an outer plate 16 arranged on the front side and an inner plate 17 arranged on the rear side to each other. The front side plate 14 has a certain thickness in the fore and aft direction, and the lateral width of the rear part thereof is reduced in a stepwise manner with respect to the lateral width of the front part thereof. When the lid 3 is in the closed position, the lateral end faces of the rear part of the front side plate 14 oppose the inner faces of the left and right box side walls 2B, respectively, and the faces of the lateral edge parts of the front side plate 14 facing rearward oppose the front faces of the box side walls 2B, respectively.

A knob hole 21 is formed in an upper part of the outer plate 16 as a hole passed through the outer plate 16 in the thickness-wise direction thereof. An operation recess 22 is formed in a part of the front face of the outer plate 16 located to the right of the knob hole 21 adjacent to the knob hole 21.

Figure 2:
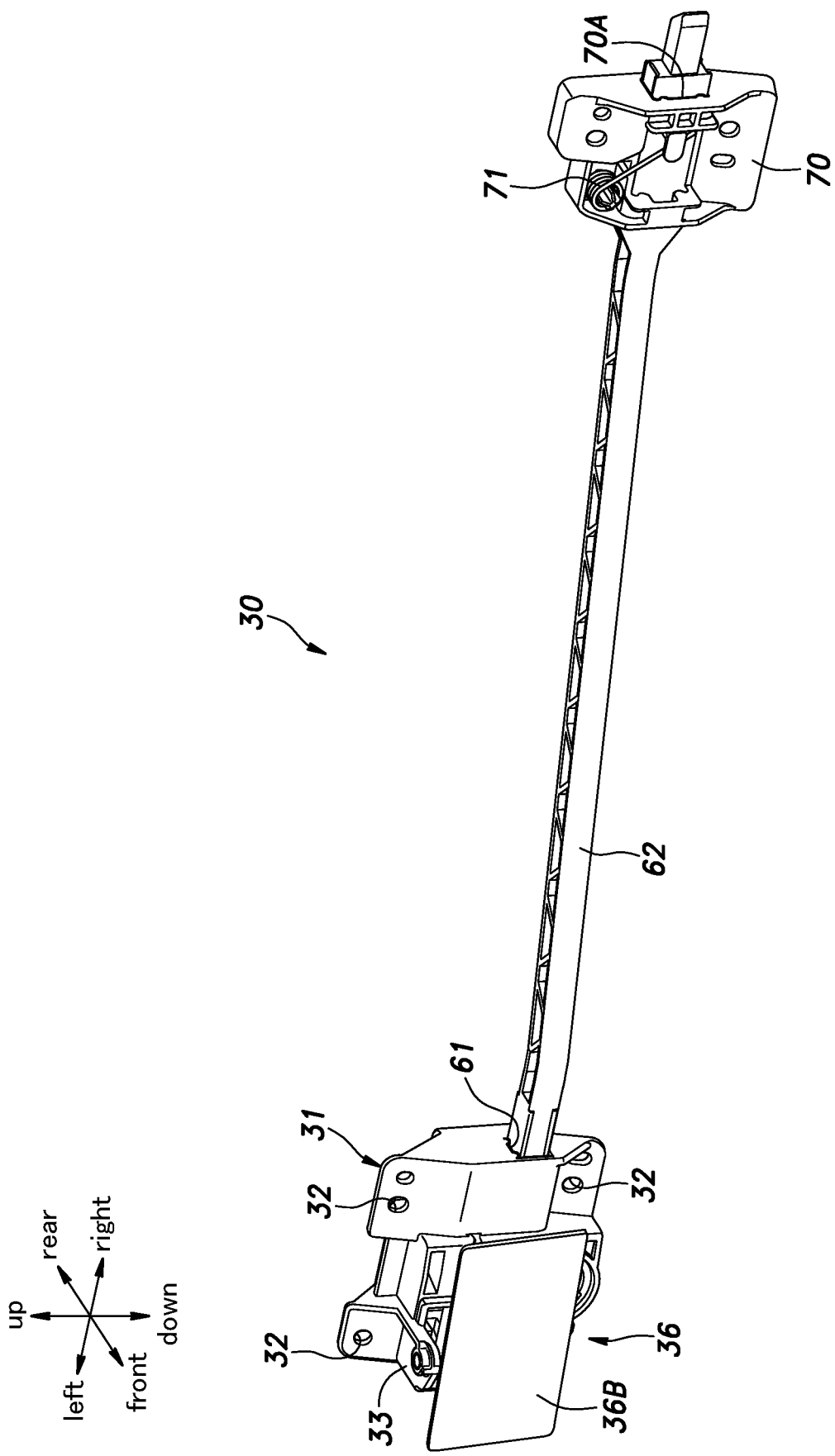
FIG. 2 is a perspective view of the lock device.
Figure 3:
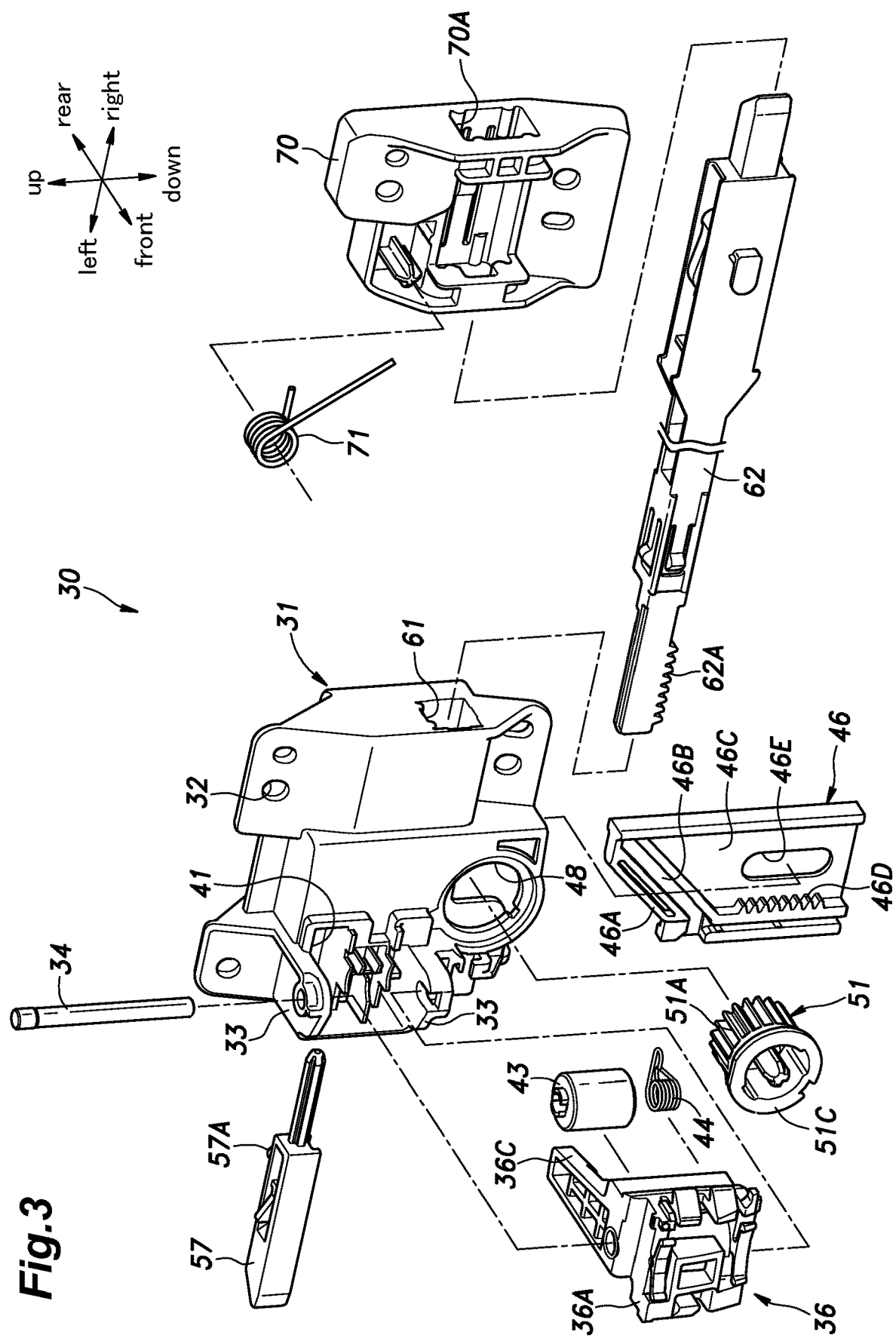
FIG. 3 is an exploded perspective view of the lock device.

The front side plate 14 of the lid 3 is provided with a lock device 30 for maintaining the lid 3 in the closed position with respect to the box 2. As shown in FIGS. 2 and 3, the lock device 30 is provided with a base 31, and is attached to the front side plate 14 via this base 31. The base 31 is formed in the shape of a block, and is provided with screw holes 32 passed through in the fore and aft direction at appropriate positions along the periphery thereof. The base 31 is fastened to at least one of the rear surface of the outer plate 16 and the front surface of the inner plate 17 by screws passed through the screw holes 32.

The base 31 is provided with a pair of support pieces 33 projecting forward from an upper part and a lower part of the front surface thereof, respectively, at positions corresponding to the knob holes 21. A support shaft 34 extends vertically between the upper and lower support pieces 33. A knob base portion 36A forming a part of the knob 36 is rotatably supported by the support shaft 34. The front ends of the support pieces 33 and the knob base portion 36A project through the knob hole 21, and protrude to the front side of the outer plate 16. A plate-like grip portion 36B is attached to the front end of the knob base portion 36A. As shown in FIG. 1, the grip portion 36B extends in the operation recess 22.

As shown in FIGS. 2 and 3, the knob base portion 36A is provided with an arm portion 36C extending rearward from a rear part thereof. The base 31 is provided with an arm receiving hole 41 passed through an upper part thereof corresponding to the arm portion 36C in the fore and aft direction, and having a certain lateral length. The arm portion 36C protrudes into the arm receiving hole 41 and is rotatable in a predetermined range around a vertically extending axial line. The knob 36 has an initial position in which a large part of the grip portion 36B is located in the operation recess 22 and the front surface of the grip portion 36B is substantially flush with the front surface of the outer plate 16, and an operated position in which the free end of the grip portion 36B protrudes outwardly from the operation recess 22. In the present embodiment, the initial position is determined by the knob base portion 36A contacting the front surface of the base 31, and the operated position is determined by the arm portion 36C contacting the right end portion of the arm receiving hole 41. The initial position and the operated position may be angularly displaced from each other by an angle of 15° to 35°. When the knob 36 is at the initial position, the arm portion 36C extends substantially in the fore and aft direction, and when the knob 36 has moved from the initial position to the operated position, the free end portion (rear end portion) of the arm portion 36C is displaced rightward.

As shown in FIG. 3, a rotary damper 43 for damping the rotation of the knob base portion 36A with respect to the support shaft 34 is interposed between the knob base portion 36A and the support shaft 34. The rotary damper 43 may be, for example, a cylindrical damper in which a viscous fluid is sealed. A first biasing member 44 is provided between the knob base portion 36A and the base 31 to bias the knob 36 toward the initial position. In the present embodiment, the first biasing member 44 consists of a per se known torsion coil spring, and includes a coil portion supported by the support shaft 34, an end engaged by the base 31, and another end engaged by the knob base portion 36A.

A slider receiving hole is passed vertically through a rear part of the base 31 to receive a slider 46 so as to be slidable in the vertical direction between an upper position and a lower position. The slider 46 is formed by a plate member having a major plane facing in the fore and aft direction. The slider 46 is provided with an upper cam surface 46A which is inclined upward toward the right or is inclined vertically. The slider 46 is additionally provided with a cam groove 46B which is recessed rearward in an upper part of the front surface thereof, and extends obliquely upward toward the right. The cam groove 46B extends under the upper cam surface 46A so as to be inclined in the vertical direction which is the sliding direction of the slider 46.

The slider 46 is further provided with a slider recess 46C recessed rearward in a front surface of a part thereof located under the cam groove 46B. The slider recess 46C extends vertically, and its lower end reaches the lower edge of the slider 46. The left side wall defining the slider recess 46C extends vertically, and is formed with a first rack 46D extending vertically with the teeth thereof facing rightward on the side surface on the recess side wall. The slider 46 is provided with an insertion hole 46E penetrating in the thickness-wise direction thereof (fore and aft direction) and elongated vertically in a central part of the bottom wall of the slider recess 46C.

Figure 4:
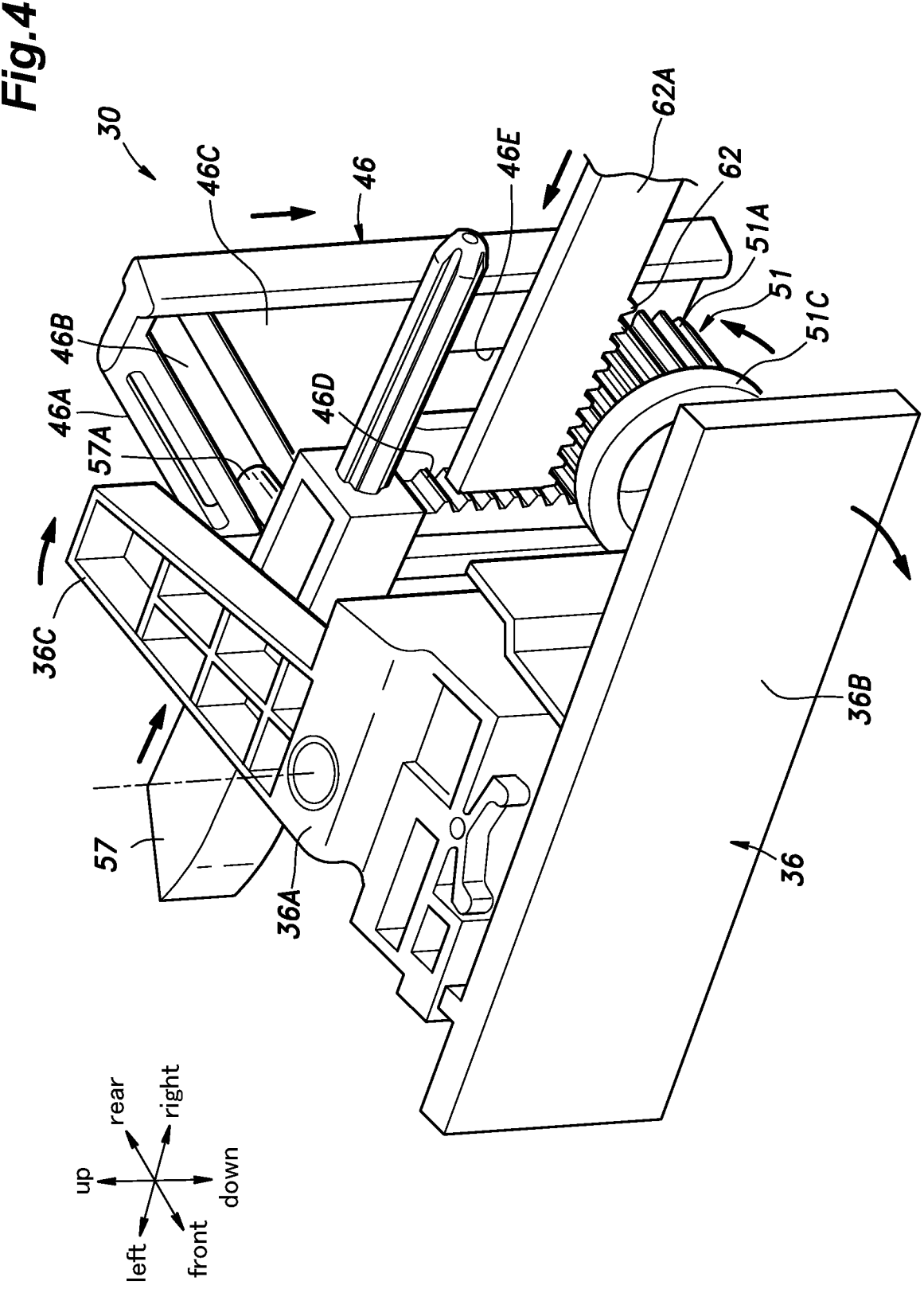
FIG. 4 is a perspective view seeing through a base to show the positions of a knob, a slider, a first rod and a second rod.
Figure 6:
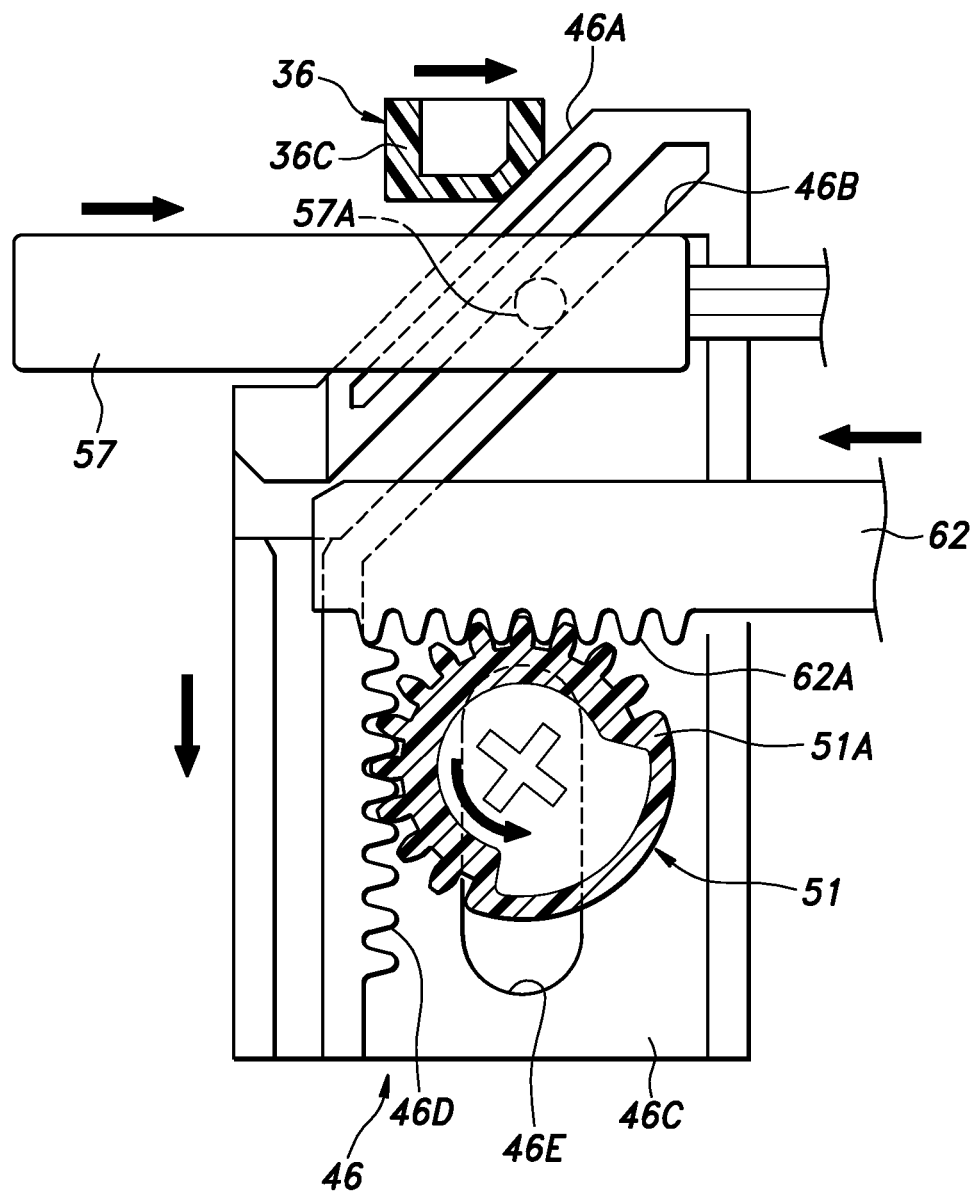
FIG. 6 is a front view seeing through the base to show the positions of the knob, the slider, the first rod and the second rod.

The base 31 is provided with a pinion receiving hole 48 in a lower part thereof positioned in front of the slider receiving hole. The pinion receiving hole 48 is connected to a lower front side of the slider receiving hole. The pinion receiving hole 48 receives a pinion 51 therein so as to be rotatable around an axial line extending in the fore and aft direction. The pinion 51 is provided with a large diameter portion 51A on the front side and a small diameter portion 51B coaxially formed on the rear side of the large diameter portion 51A. The small diameter portion 51B is passed through the insertion hole 46E of the slider 46 and is rotatably received by a bearing hole formed in a rear part of the base 31. The rear end portion of the large diameter portion 51A is supported in a bearing hole consisting of a through hole formed in a front part of the base 31 so as to be rotatable but immovable in the fore and aft direction. The large diameter portion 51A is provided with a flange portion 51C having a diameter larger than the inner diameter of the bearing hole at the rear end thereof and a plurality of resilient claws protruding from the flange portion 51C toward the small diameter portion 51B in a spaced apart relationship to the flange portion 51C so that a peripheral edge of the bearing hole is securely interposed between the flange portion 51C and the claws. When the pinion 51 is inserted into the bearing hole from the front side, the resilient claw flexes inward in the radial direction, passes through the bearing hole, and then regains the original shape to engage the peripheral edge of the bearing hole. The large diameter portion 51A is provided with teeth on the outer peripheral surface thereof so as to form a spur gear. As shown in FIGS. 4 and 6, the rear end part of the large diameter portion 51A projects into the slider recess 46C, and meshes with the first rack 46D.

The upper part of the slider receiving hole is connected to the rear part of the arm receiving hole 41. The free end of the arm portion 36C projects into the slider receiving hole via the arm receiving hole 41, and is positioned at an upper left part of the slider 46 so as to be in sliding contact with the upper cam surface 46A.

Figure 5:
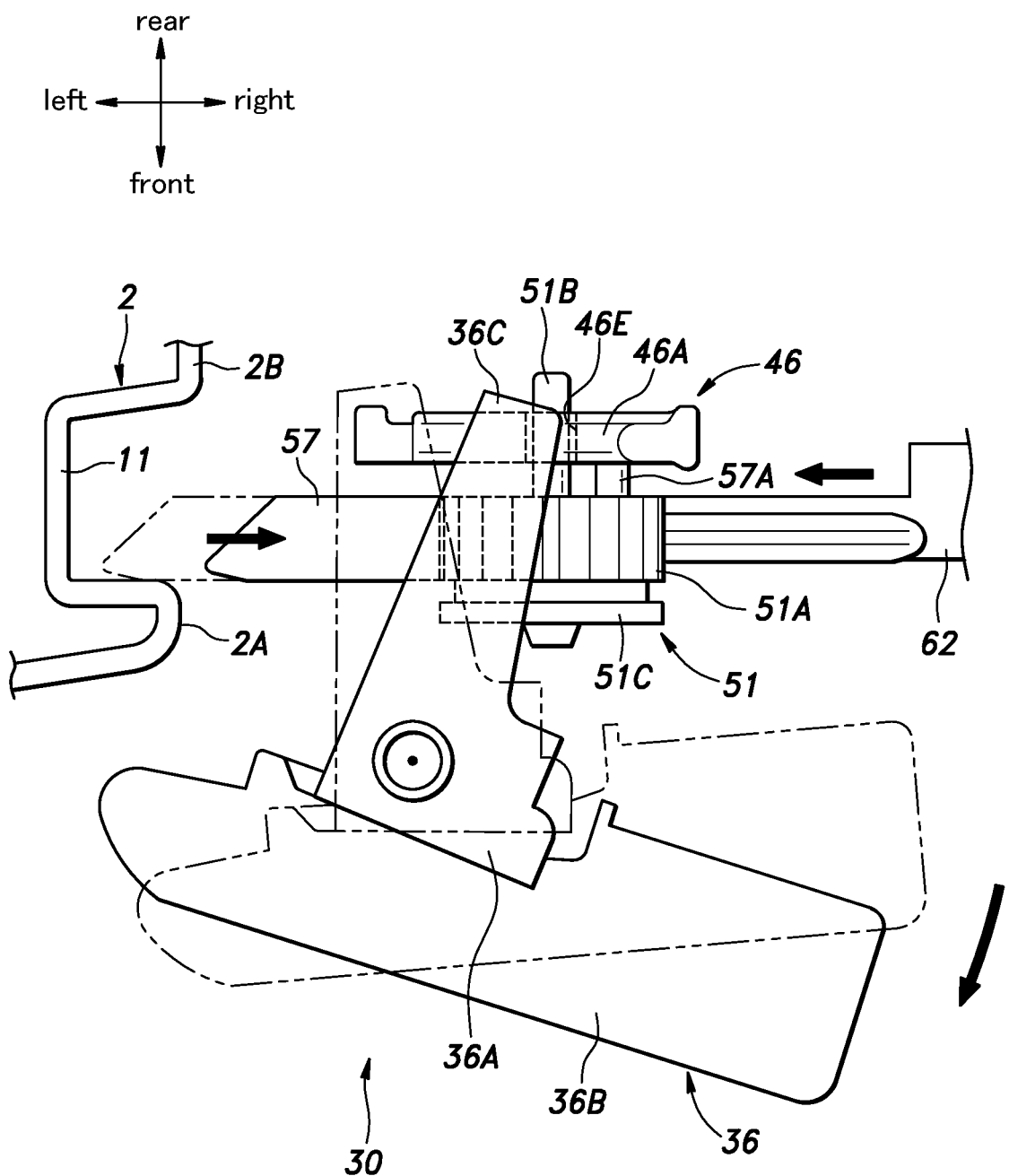
FIG. 5 is a plan view seeing through the base to show the positions of the knob, the slider, the first rod and the second rod.

The base 31 is provided with a first rod receiving hole extending rightward from the left end face thereof. The first rod receiving hole thus extends laterally along the front side of the slider receiving hole and is connected to the slider receiving hole at the rear part thereof. As shown in FIGS. 2 and 3, the base end portion (right end portion) of a laterally extending first rod 57 is supported in the first rod receiving hole so as to be slidable in the lengthwise direction thereof. The base end portion of the first rod 57 inserted in the first rod receiving hole is disposed on the front side of the slider 46, and is provided with a pin 57A projecting rearward from the rear surface thereof and projecting into the cam groove 46B. Owing to the engagement between the pin 57A and the cam groove 46B, the first rod 57 moves in the lateral direction as the slider 46 moves vertically. The first rod 57 extends leftward from the base 31, and the free end thereof protrudes leftward from the base 31 to pass through a through hole formed in the left end face of a rear part of the front side plate 14. As shown in FIG. 5, when protruding from the left end face of the front side plate 14, the free end (left end) of the first rod 57 is received by the left engaging hole 11 formed in the left box side wall 2B. In other words, the first rod 57 can be locked in the left engaging hole 11 so as to form an engaging portion. The position where the free end portion of the first rod 57 protrudes to the left from the left end surface of the front side plate 14 is referred to as the projecting position of the first rod 57, and the position where the free end portion of the first rod 57 is most retracted into the front side plate 14 is referred to as the retracted position of the first rod 57. The first rod 57 slidably moves between the projecting position and the retracted position so that the first rod 57 can be selectively engaged by and disengaged from the left engaging hole 11. The rear part of the free end portion of the first rod 57 is formed as an inclined surface that is inclined forward toward the free end side thereof.

As shown in FIGS. 2 and 3, the base 31 is provided with a second rod receiving hole 61 extending leftward from the right end face thereof. The second rod receiving hole 61 extends in the lateral direction in front of the slider receiving hole. The second rod receiving hole 61 is connected to the slider receiving hole in the rear part thereof, and is connected to the pinion receiving hole 48 in the lower part thereof. The base end portion (left end portion) of a second rod 62 extending in the lateral direction is supported in the second rod receiving hole 61 so as to be slidable in the lengthwise direction thereof. The second rod 62 extends rightward from the base 31. The first rod 57 and the second rod 62 extend in parallel to each other and in mutually opposite directions from the base 31. In addition, the first rod 57 and the second rod 62 are arranged one above the other, and overlap with each other when seen from above. The first rod 57 and the second rod 62 are arranged in front of the slider 46, and the rotational center line of the knob 36 is disposed in front of the first rod 57 and the second rod 62.

As shown in FIGS. 4 and 6, the base end portion of the second rod 62 inserted in the second rod receiving hole 61 is disposed on the front side of the slider 46 and above the pinion 51, and is provided with a second rack 62A having teeth projecting downward on the lower surface thereof and extending in the lateral direction. The pinion 51 meshes with the second rack 62A in the front portion of the large diameter portion 51A so that the pinion 51 meshing with the first rack 46D rotates as the slider 46 moves vertically, and this in turn causes the second rod 62 having the second rack 62A meshing with the pinion 51 moves in the lateral direction. The second rod 62 and the second rack 62A are offset forward with respect to the first rack 46D so as to avoid interference with the first rack 46D. The cam groove 46B and the pin 57A connecting the slider 46 with the first rod 57, and the first rack 46D connecting the slider 46 with the second rod 62, the pinion 51 and the second rack 62A form a power transmission mechanism for slidingly moving the first rod 57 and the second rod 62 in response to the movement of the slider 46.

The free end of the second rod 62 protrudes rightward from the base 31, and can pass through a through hole formed in the right end surface of the rear part of the front side plate 14. The free end of the second rod 62 can project into the right engaging hole 12 formed in the right box side wall 2B when protruding from the right end surface of the front side plate 14. In other words, the second rod 62 can be engaged by the right engaging hole 12 so as to form an engaging portion. The position where the free end portion of the second rod 62 protrudes to the right from the right end surface of the front side plate 14 is referred to as the projecting position of the second rod 62 and the position where the free end portion of the second rod 62 is most retracted into the front side plate 14 is referred to as the retracted position of the second rod 62. The second rod 62 slidingly moves between the projecting position and the retracted position so that the second rod 62 can be selectively engaged by and disengaged from the right engaging hole 12. The rear part of the free end portion of the second rod 62 is formed with an inclined surface that is inclined forward toward the free end side.

As shown in FIGS. 2 and 3, the end portion of the second rod 62 on the side of the right engaging hole 12 is supported by a guide member 70 provided on the front side plate 14. The guide member 70 is provided with a laterally extending guide hole 70A, and is fastened to at least one of the rear surface of the outer plate 16 and the front surface of the inner plate 17 by using screws. An end part of the second rod 62 on the side of the right engaging hole 12 is passed through the guide hole 70A, and a free end portion thereof protrudes out of the guide hole 70A. By supporting the second rod 62 in the guide hole 70A, the second rod 62 is prevented from deflecting so that the position of the free end portion of the second rod 62 can be stabilized.

Between the guide member 70 and the second rod 62 is provided a second biasing member 71 biasing the second rod 62 toward the projecting position with respect to the lid 3. The second biasing member 71 consists of a per se known torsion coil spring, and includes a coil portion supported by the guide member 70, an end engaged by the guide member 70 and another end engaged by an end of the second rod 62 on the side of the right engaging hole 12. The second rod 62 is thus biased toward the projecting position by the second biasing member 71 so that the slider 46 is urged toward the upper position via the power transmission mechanism, and comes into contact with the arm portion 36C at the upper cam surface 46A. Further, the first rod 57 connected to the slider 46 via the power transmission mechanism is biased toward the projecting position.

The operation and effect of the lock device 30 configured as described above will be described in the following. When the knob 36 is not operated by a user, the knob 36 is in the initial position under the biasing force of the first biasing member 44. Also, the first rod 57 and the second rod 62 are placed in the projecting position under the biasing force of the second biasing member 71 while the slider 46 is in the upper position where the upper cam surface 46A is in contact with the arm portion 36C. In this state, when the lid 3 is in the closed position, the free end portion of the first rod 57 is engaged by the left engaging hole 11, and the free end portion of the second rod 62 is engaged by the right engaging hole 12 so that the lid 3 is kept in the closed position. When the lid 3 is moved from the open position to the closed position while the first rod 57 and the second rod 62 are in the projecting position, the free end portion of the first rod 57 and the free end portion of the second rod 62 are pushed by the front edges of the left and right box side walls 2B at the inclined surfaces on the rear sides thereof, respectively, and move to the retracted position against the biasing force of the second biasing member 71. At this time, the slider 46 moves away from the arm portion 36C to the lower position, and the knob 36 does not rotate. When the free end portion of the first rod 57 and the free end portion of the second rod 62 have moved to positions corresponding to the left engaging hole 11 and the right engaging hole 12, respectively, the first rod 57 and the second rod 62 have moved to the projecting positions and are locked in the left engaging hole 11 and the right engaging hole 12 under the biasing force of the second biasing member 71.

As shown in FIGS. 4 to 6, when the user holds the grip portion 36B of the knob 36 and pulls it forward, the knob 36 rotates about the support shaft 34 so that the arm portion 36C rotates rightward from the rearwardly extending state. As the arm portion 36C moves to the right, the arm portion 36C slides over the upper cam surface 46A so that the slider 46 is pushed down toward the lower position by the arm portion 36C. Due to the downward movement of the slider 46, the pin 57A engaged by the cam groove 46B moves rightward in the cam groove 46B so that the first rod 57 moves to the retracted position. In addition, the second rod 62 connected to the slider 46 via the first rack 46D, the pinion 51, and the second rack 62A moves to the retracted position by the downward movement of the slider 46. As a result, when the lid 3 is in the closed position, the free end of the first rod 57 is disengaged from the left engaging hole 11, and the second rod 62 is disengaged from the right engaging hole 12 so that the lid 3 can be moved to the open position.

Since both the first rod 57 and the second rod 62 are disposed on the front side of the slider 46, the thickness of the lock device 30 as measured in the fore and aft direction can be reduced. Since the first rod 57 and the second rod 62 are disposed so as to overlap in the vertical direction, the fore and aft width required for accommodating the first rod 57 and the second rod 62 can be minimized so that the width of the base 31 and the lock device 30 as measured in the fore and aft direction can be reduced.

Since the slider 46 is positioned behind the first rod 57 and the second rod 62 in the base 31, and a distance is secured between the slider 46 and the knob 36 provided in the front, the length of the arm portion 36C can be maximized. Thus, the amount of movement of the slider 46 for a given angular movement of the knob 36 can be increased, and the amount of movement of the first rod 57 and the second rod 62 can be increased.

Since the connection between the slider 46 and the first rod 57 is achieved by the engagement between the cam groove 46B and the pin 57A, and the connection between the slider 46 and the second rod 62 is achieved by the engagement between the first rack 46D, the pinion 51, and the second rack 62A, the size of the slider 46 can be minimized. Suppose that in moving the first rod 57 and the second rod 62 in mutually opposite directions by means of the movement of the slider 46, the slider 46 and the second rod 62 are connected by a cam groove 46B and a pin 57A in a similar manner. Then, since the extending direction of the cam groove 46B corresponding to the first rod 57 and the extending direction of the cam groove 46B corresponding to the second rod 62 are not parallel to each other, it is necessary to enlarge the slider 46 in order to avoid interference.

By supporting the second rod 62 on the guide member 70, the movement locus of the second rod 62 can be stabilized so that the free end of the second rod 62 can smoothly enter the right engaging hole 12. Since the second biasing member 71 is provided at a position remote from the base 31, the size of the base 31 can be reduced so that the fore and aft thickness of the lock device 30 can be minimized. Further, since the second biasing member 71 is provided in the end portion of the second rod 62 on the side of the right engaging hole 12, the biasing force of the second biasing member 71 is transmitted to the free end portion of the second rod 62 in a reliable manner so that any rattling between the second rod 62 and the right engaging hole 12 can be avoided.

Figure 7:
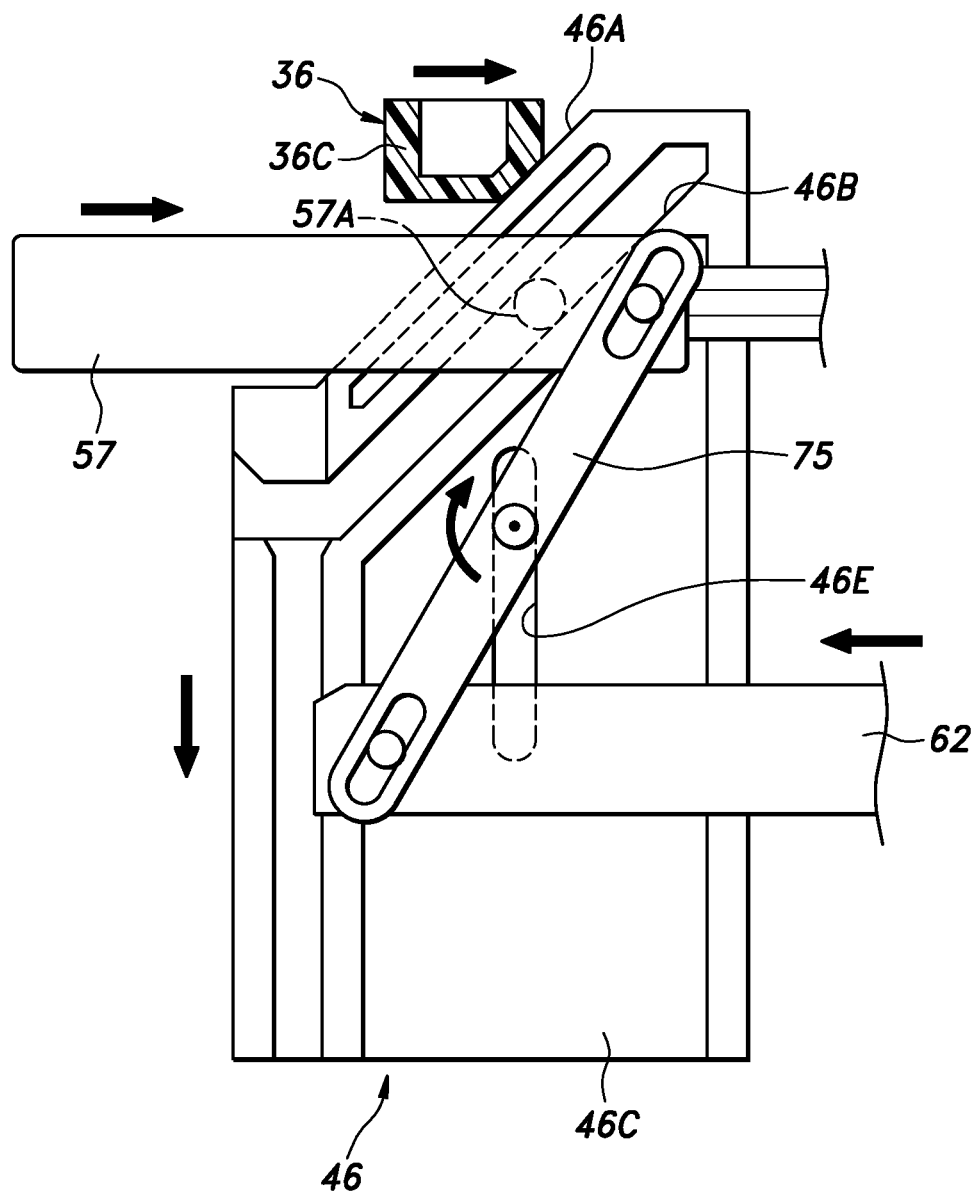
FIG. 7 is a front view seeing through a base to show the positions of a knob, a slider, a first rod and a second rod in a lock device according to a modified embodiment.

While a specific embodiment has been described above, the present invention is not limited to the above-described embodiment, but can be widely modified. For example, instead of the first rack 46D, the pinion 51, and the second rack 62A, the power transmission mechanism that moves the second rod 62 in response to the movement of the slider 46 may be based on a swing link. For example, a link 75 may be provided on the base 31 as shown in FIG. 7. The link 75 is supported so as to be rotatable about an axial line extending in the fore and aft direction on the base 31 at the center portion thereof with respect to the lengthwise direction thereof, and rotatably connected to the base end portions of the first rod 57 and the second rod 62 at the respective end portions thereof with respect to the lengthwise direction. The rotational center line of the link 75 may be disposed in the insertion hole 46E of the slider 46.

In the above embodiment, the knob 36 is rotatably supported by the base 31, but in other embodiments, the knob 36 is slidably supported on the base 31. For example, the knob 36 may be supported on the front surface of the base 31 so as to be slidable in the lateral direction. In this case, as the knob 36 moves to the right, the arm portion 36C pushes the slider 46 downward at the upper cam surface 46A thereof.

Glossary of Terms

| | |
|---|---|
| 1: glove box | 2: box |
| 2A: opening | 3: lid |
| 11: left engaging hole | 12: right engaging hole |
| 30: lock device | 31: base |
| 36: knob | 36A: knob base portion |
| 36B: grip portion | 36C: arm portion |
| 41: arm receiving hole | 46: slider |
| 46A: upper cam surface | 46B: cam groove |
| 46D: first rack | 46E: insertion hole |
| 51: pinion | 57: first rod |

| | |
|---|---|
| 57A: pin | 61: second rod receiving hole |
| 62: second rod | 62A: second rack |
| 75: link | |

The invention claimed is:

1. A lock device for a storage device, the storage device having a box opening forward and a lid configured to close the opening of the box, the lock device comprising:
   a base attached to the lid;
   a knob having a grip portion movably supported on a front side of the base and arranged on a front surface of the lid and an arm portion projecting rearward with respect to the grip portion;
   a slider slidably supported in a rear part of the base so as to move slidingly by being pushed by the arm portion in response to a movement of the knob;
   a first rod and a second rod slidably supported by a part of the base located in front of the slider in a vertically arranged manner, and extending in parallel to each other in mutually opposite directions from the base so as to be engaged by and disengaged from a pair of corresponding engaging portions provided on the box as the first rod and the second rod move slidingly; and
   a power transmission mechanism provided between the slider and the first rod and the second rod so that the first rod and the second rod are slidingly moved in response to a movement of the slider,
      wherein the base rotatably supports the knob about an axial line extending vertically, vertically slidably supports the slider, and laterally slidably supports the first rod and the second rod,
      the base is provided with an arm receiving hole extending in a fore and aft direction and rotatably receiving the arm portion, and
      the base includes a slider receiving hole extending vertically to receive the slider in a vertically slidable manner, a first rod receiving hole extending laterally to receive the first rod in a laterally slidable manner, and a second rod receiving hole extending laterally to receive the second rod in a laterally slidable manner, the slider receiving hole being connected to the arm receiving hole, the first rod receiving hole, and the second rod receiving hole.

2. The lock device according to claim 1, wherein the knob is supported so as to be rotatable about an axial line positioned in front of the first rod and the second rod.

3. The lock device according to claim 1, wherein the power transmission mechanism includes a cam groove recessed from a front surface of the slider, and extending obliquely relative to a direction of a sliding movement of the slider, and a pin projecting from a rear surface of the first rod and engaged by the cam groove.

4. The lock device according to claim 3, wherein the power transmission mechanism includes a first rack formed on the front surface of the slider and extending along the direction of the sliding movement of the slider, a second rack provided on the second rod and extending along a lengthwise direction of the second rod, and a pinion rotatably supported by the base and meshing with the first rack and the second rack.

5. The lock device according to claim 1, wherein the slider is provided with a cam surface inclined with respect to a vertical direction along a side edge thereof, and is configured to be pushed by the arm portion at the cam surface.

6. The lock device according to claim 1, further comprising a biasing member provided on an end portion of the first rod or the second rod on a side of the engaging portion to bias the first rod or the second rod toward the engaging portion with respect to the lid.

7. The lock device according to claim 6, further comprising a guide member provided on the lid and provided with a guide hole through which the end portion of the first rod or the second rod on the side of the engaging portion passes, the biasing member being provided between the guide member and the first rod or the second rod.

\* \* \* \* \*